United States Patent [19]

Schmall

[11] Patent Number: 4,810,966

[45] Date of Patent: Mar. 7, 1989

[54] INDUCTIVE SENSOR ARRANGEMENT AND MEASURING ARRANGEMENT FOR USE THEREOF

[76] Inventor: Karl-Heinz Schmall, Waldstrasse 20, D-7570 Baden-Baden 19, Fed. Rep. of Germany

[21] Appl. No.: 622,120

[22] Filed: Jun. 19, 1984

[30] Foreign Application Priority Data

Jul. 5, 1983 [CH] Switzerland ............... 3682/83

[51] Int. Cl.$^4$ ................................ G01B 7/14
[52] U.S. Cl. .................... 324/207; 324/236; 318/607; 219/124.02
[58] Field of Search ........... 324/207, 208, 226, 228, 324/232, 234, 236–243, 260–262; 219/124.02, 124.22, 124.34, 124.4, 123; 336/226, 228, 225, 232, 199–208

[56] References Cited

U.S. PATENT DOCUMENTS

| | | | |
|---|---|---|---|
| 2,867,783 | 1/1959 | Childs | 336/200 X |
| 2,900,612 | 8/1959 | Tripp | 336/123 |
| 3,268,805 | 8/1966 | Normando | 324/240 |
| 3,827,291 | 8/1974 | McCalvey | 324/208 X |
| 4,015,101 | 3/1977 | Hannappel et al. | 219/124.02 X |
| 4,223,300 | 9/1980 | Wiklund | 324/208 X |
| 4,298,784 | 11/1981 | Schmall | 219/124.02 |
| 4,333,052 | 6/1982 | Schmall | 324/236 X |
| 4,438,754 | 3/1984 | Nanny et al. | 324/207 X |

FOREIGN PATENT DOCUMENTS

| | | | |
|---|---|---|---|
| 3014137 | 10/1981 | Fed. Rep. of Germany | 324/208 |
| 0105505 | 6/1984 | Japan | 324/207 |
| 697802 | 5/1979 | U.S.S.R. | 324/208 |
| 800610 | 1/1981 | U.S.S.R. | 324/208 |
| 848985 | 7/1981 | U.S.S.R. | 324/208 |
| 994907 | 2/1983 | U.S.S.R. | 324/207 |

OTHER PUBLICATIONS

Karl Heinz Schmall, "Sensoren fur Schweiss-und Schneidvorgange," Automobil-Industrie, 4/82, pp. 435–442.

Primary Examiner—Reinhard J. Eisenzopf
Assistant Examiner—Warren S. Edmonds
Attorney, Agent, or Firm—William R. Hinds

[57] ABSTRACT

The sensor arrangement according to the invention serves to determine the spacing from a non-magnetic or ferro-magnetic article. In addition, it seeks to make it possible to determine the relative position of the sensor with respect to irregularities on the article such as gaps or holes. The inductive sensor arrangement has an oscillator which feeds a transmitting coil which in turn induces alternating current, in dependence on the relative position with respect to the article, in a receiving component coil. By virtue of the transmitting and/or receiving component coil being in the form of a metal layer on at least one surface of a laminar coil carrier, it is possible substantially to improve measuring accuracy and also the degree of sensitivity of the sensor arrangement.

18 Claims, 7 Drawing Sheets

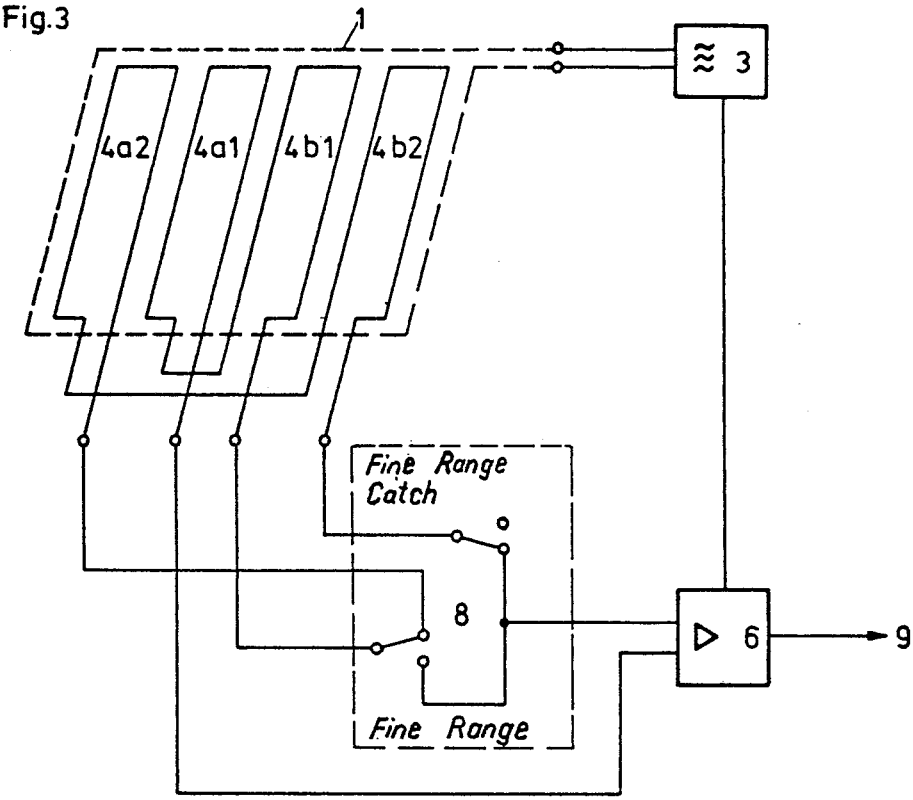

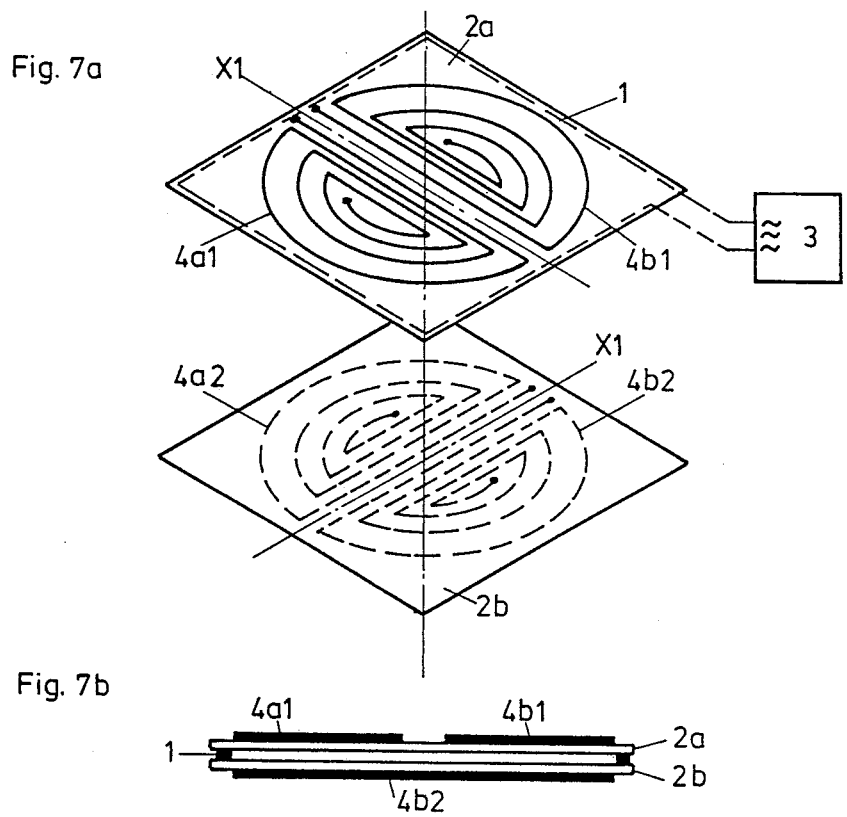
Fig. 7a
Fig. 7b
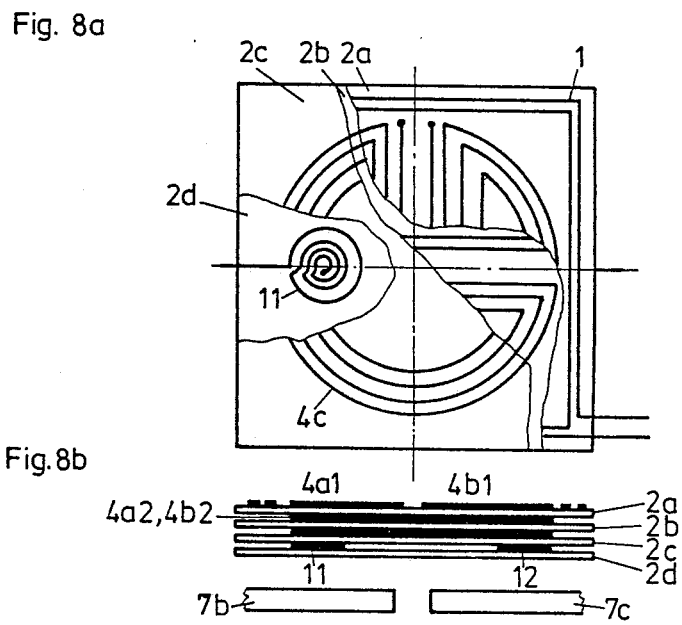
Fig. 8a
Fig. 8b 4,810,966

INDUCTIVE SENSOR ARRANGEMENT AND MEASURING ARRANGEMENT FOR USE THEREOF

FIELD OF THE INVENTION

The invention relates to an inductive sensor arrangement having at least one transmitting coil which is supplied with a.c. voltage by an oscillator and at least one receiving coil, for determining the distance and/or the relative position of the receiving coil with respect to a surface irregularity such as a gap or an edge of a metal article, wherein an alternating current which is dependent in respect to phase position and/or amplitude on the respective relative position of the article and the sensor arrangement is induced in the receiving coil by the transmitting coil.

DESCRIPTION OF THE PRIOR ART

Inductive sensing arrangements of the specified kind are known in a very wide range of different constructions and are described for example in the present applicant's European Patent Application No. 7034 or the applicant's French Patent Application No. 2 394 783, and the citations referred to therein. Such sensor arrangements are generally based on the concept that, by approaching a non-magnetic or ferro-magnetic material, the inductance of an oscillating circuit is altered by magnetic properties of the material, damping and/or the formation of an eddy current, which, in a given range, is a function of the spacing of the article. Such sensor arrangements are limited in regard to resolution and in particular are not suitable for detecting article irregularities such as for example gaps, holes or raised portions, with a high degree of accuracy. On the contrary, they are restricted in use to measuring distances.

SUMMARY OF THE INVENTION

The invention is based on the problem of providing an inductive sensor arrangement which permits a high degree of resolution and measuring accuracy and which can also be used in regard to irregular surface configurations of the article. In addition, the sensor arrangement is to be simple in design and fail-safe in use.

According to the invention, that is primarily achieved in that the transmitting and/or receiving coils are applied in the form of a metal layer to at least one surface of a laminar, electically non-conducting coil carrier. Applying conductive layers of that kind to laminar substrates for example by a thick film or thin film process provides virtually unlimited possibilities in regard to the configuration of the coils. On the other hand, laminar substrates can be 'packed' and combined to form multi-layer coil assemblies in a very simple and very advantageous manner and, when a suitable material is used, such substrates can also be deformed, in particular bent, and thereby adapted to the surface of the article. The configuration in accordance with the invention also permits a plurality of coils to be disposed on a coil carrier, more specifically, on both surfaces thereof. Thus for example, in a very simple fashion, the receiving coils may be applied to the side of the coil carrier that is towards the article and the transmitting coil may be disposed on the surface of the coil carrier that is remote from the article. That not only provides low structural heights, small coil dimensions and thus a high degree of resolution, but it also eliminates changes in spacing, which occur due to the construction used, both between the receiving coils from each other and also between the receiving coils and the transmitting coils. That therefore minimises production tolerances and also eliminates disturbances in operation, for example, due to mechanical factors.

In accordance with the invention, sensor arrangements may be embodied in a particularly advantageous fashion, wherein a plurality of coils are arranged on the coil carrier symmetrically (with axial symmetry or point symmetry). Symmetrical arrangements of that kind are particularly advantageously suitable for follower adjustment to align to a gap and/or centering the sensor over an irrgularity of the article.

In order to adapt to articles with an irregular surface, the arrangement may advantageously have two or more coil carriers which are arranged in juxtaposition with respect to the article. Virtually any task which is set on an inductive sensor of that kind can be carried out in a manner which could not be achieved hitherto, by the combination of the features according to the invention, that is to say the use of flexible laminar substrates and-/or the 'stacking' of a plurality of coil carriersone behind the other and/or the arrangement of coil carriers in juxtaposition and/or at an angle relative to each other.

The use of sensor arrangements according to the invention is of quite particular advantage in a measuring arrangement for determining the relative position of a sensor arrangement wherein the sensor arrangement has at least one receiving coil and transmitting coil and wherein the transmitting coil is connected to an oscillator, in particular an HF-oscillator and the receiving coil is connected to an evaluation circuit for determining changes in phase and/or voltage in dependence on changes in the relative position between the article and the sensor arrangement. In accordance with the invention, in order to increase the level of resolution and/or for the purposes of adaptation to specific measuring requirements or articles, it is proposed that at least the receiving coil and/or the transmitting coil is divided into at least two component coils and that there is a change-over switching means for selectively connecting one component coil and/or the other to the evaluation circuit. If, in that arrangement, the component coils have coil areas with different effects, with respect to the article, for example the coil having the larger area may be connected to the evaluation circuit in order to achieve a wide catch range during the article approach movement, while the coil with the smaller effective area is connected to the evaluation circuit, after the approach movement has occurred in order to ensure a high degree of resolution and guidance accuracy. It is also possible to envisage the coil areas being connected in series or in opposition as required by means of the change-over switching means, depending on the function to be performed, for example, in order on the one hand to carry out a distance measuring operation or on the other hand to provide for measuring the relative position with respect to an irregularity of an article.

It will be seen that the use of a change-over switching means for switching over the component coils already results in itself in a substantial improvement in such measuring arrangements. That permits both the number of coils required to be reduced and also permits the evaluation circuit possibly to be simplified insofar as a single evaluation circuit can be alternately or cyclically used both for measuring distance and also for measuring the lateral relative position with respect to irregularities of the article. The use of the inductive sensor arrangement according to the invention, in connection with the measuring arrangement having a change-over switching means gives particularly excellent results by virtue of the universal utility thereof, mechanical stability and the lack of sensitivity to mechanical influences.

BRIEF DESCRIPTION OF THE DRAWINGS

The invention is described in greater detail hereinafter in embodiments, with reference to the drawings, in which:

FIG. 3 is a diagrammatic view of a measuring arrangement with change-over switching means and a sensor arrangement which can be switched over;

FIG. 4b shows a side view of the sensor arrangement shown in FIG. 4a;

FIG. 7a shows a diagrammatic view of a sensor arrangement with two stacked coil carriers;

FIG. 7b shows a side view of the sensor arrangement shown in FIG. 7a, with connected coil carriers;

FIG. 8a shows a diagrammatic plan view of a sensor arrangement having a plurality of component coils and two capacitive auxiliary electrodes;

FIG. 8b shows a view in section taken along A—A in FIG. 8a;

DESCRIPTION OF PREFERRED EMBODIMENTS

Figure 1A:
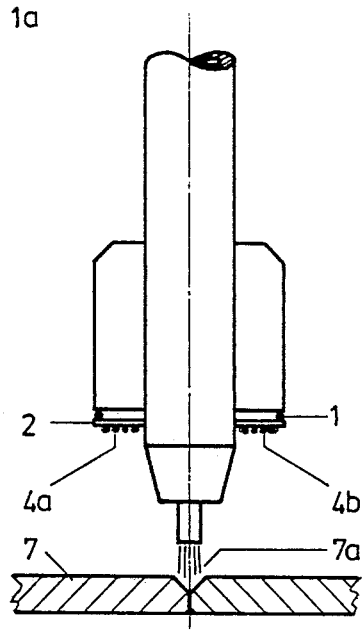
FIG. 1a shows a diagrammatic side view of an inductive sensor arrangement on an automatically controlled gas/shielded welding nozzle.
Figure 1B:
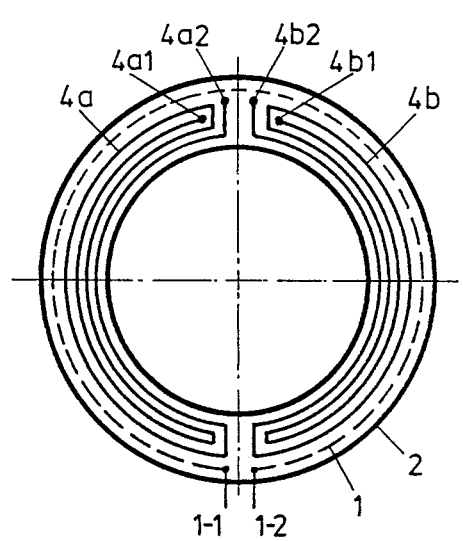
FIG. 1b shows a view of the sensor arrangement of FIG. 1a from below.

Referring to FIGS. 1a and 1b, provided around a gas shielded welding nozzle of which only the outline is shown and as are conventionally used on automatically operated welding installations is an inductive sensor arrangement having an annular coil carrier 2. Formed on the coil carrier 2 by a thick film process, on the top side thereof, is a transmitting coil 1 while on the underside there are a first receiving component coil 4a and a second receiving component coil 4b. The component coils 4a and 4b are of axially symmetrical construction and are disposed over the two halves of a plate 7 which is interrupted by a cut. The transmitting coil 1 generates an electromagnetic field which in the plate 7 produces eddy currents which in turn affect the component coils 4a and 4b. By virtue of the symmetry of the two component coils 4a and 4b, it will be seen that they are affected in identical fashion as long as the gas shielded welding nozzle and therewith the arrangement comprising the transmitting coil 1 and the receiving coils 4a and 4b are disposed centrally over the cut 7a in the plate 7. However, as soon as a shift from the center occurs, the component coils are affected differently and an output voltage which differs in phase position and/or amplitude occurs at the outputs 4a1, 4a2 and 4b1, 4b2 respectively; the above-mentioned output voltage can be evaluated in per se known manner and can be used to produce a signal that is proportional to the shift from the center.

By virtue of the coil carrier 2 being in the form of an annular disc with relative thin coil coating thereon, the overall arrangement may be of an extraordinarily compact construction and may also be disposed close to the welding region, which ensures a high degree of measuring accuracy. In that respect, the thick film process or the thin film process, on ceramic substrates, permit high ambient temperatures.

FIG. 2 shows a sensor arrangement wherein four receiving component coils 4a1, 4a2, 4b1, 4b2 are arranged on a coil carrier 2. In that arrangement, the component coils 4a1 and 4a2 are arranged in a position of axial symmetry with respect to the component coils 4b1 and 4b2 It will be seen that, by virtue of the greater distance of the component coils 4a2 and 4b2 from the axis of symmetry, this arrangement gives a greater 'catch range' in regard to approach to an irregularity on an article, for example, a cut 7a as shown in FIG. 1a. That means that, when the sensor arrangement moves towards the cut 7a (for example from above), the irregularity produced by the gap 7a in regard to influencing the HF-field produced by the transmitting coil 1 can be initially 'tracked down' with a high degree of reliability by evaluation of the signals produced by the outside component coils 4a2 and 4b2. As soon as the sensor arrangement is positioned in the close region above the cut 7a however, the component coils should be positioned more closely to the irregularity, that is to say, the cut 7a. For that purpose, the signals produced by the inward component coils 4a1 and 4b1 can then be evaluated, whereby it is possible to achieve a very high degree of adjustment accuracy.

Figure 2A:
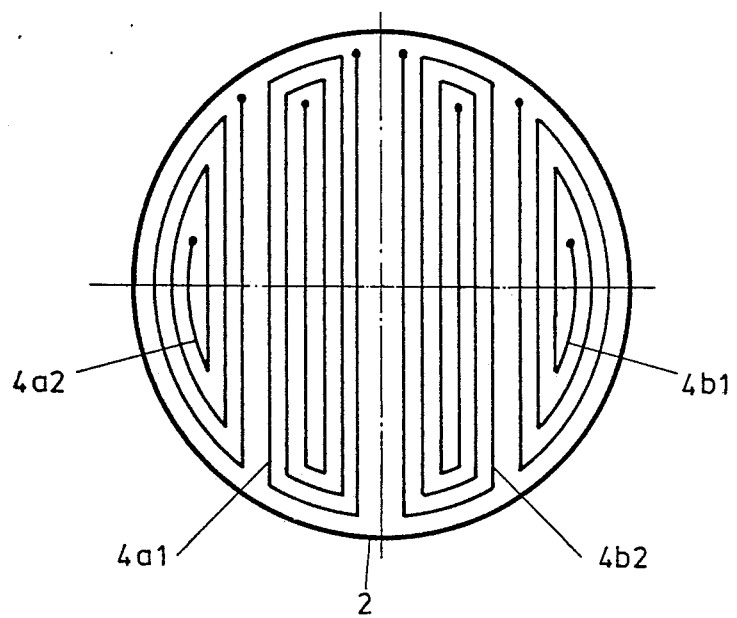
FIG. 2a shows an inductive sensor arrangement with a plurality of component coils.
Figure 2B:
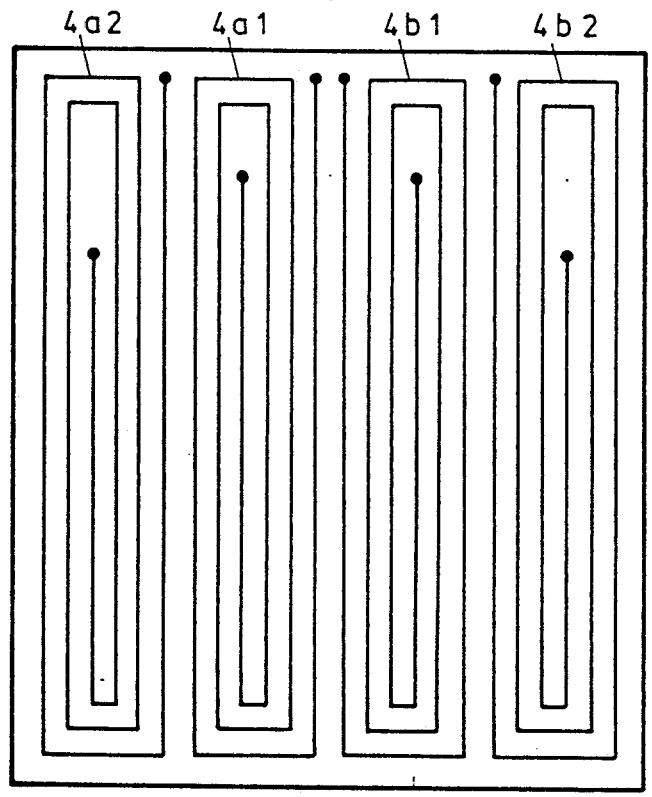
FIG. 2b shows a sensor arrangement similar to that shown in FIG. 2a, but with a different coil shape.
Figure 2C:
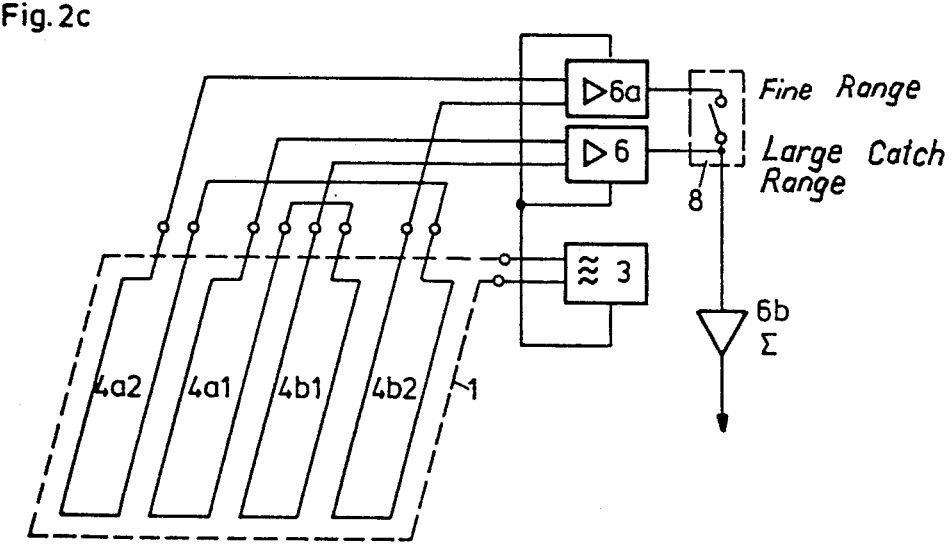
FIG. 2c shows a measuring arrangement having the features of the invention, using the sensor arrangement shown in FIG. 2b.

FIG. 2b shows an embodiment similar to that shown in FIG. 2a, except that the paths of the component coils 4a1, 4a2, 4b1, 4b2 extend in a rectangular configuration. FIG. 2c shows the block diagram of a measuring arrangement in which the signals produced by the sensor arrangement shown in FIG. 2a or FIG. 2b can be evaluated. In that arrangement, the transmitting coil is energized by an HF-oscillator 3. The receiving component coils 4a1 and 4b1 are connected in opposition in the direction of winding and are connected to the input of a first amplifier 6. By virtue of the opposite connection of the component coils 4a1 and 4b1, their output voltages cancel each other out as long as they are symmetrically affected by the article. However, as soon as asymmetry occurs, that is to say, as soon as for example the cut 7a is no longer precisely aligned with the axis of symmetry of the coil arrangement, one of the two component coils is less affected by the presence of the cut while the other component coil is more affected. The amplifier 6 is in the form of an amplitude and/or phase comparator and receives a reference voltage from the HF-oscillator 3. Any assymetry in the component coils 4a1, 4b1 results in an amplitude and/or phase shift of the resulting signal so that a signal is produced at the output of the amplifier 6. In the same way, the outward receiving component coils 4a2 and 4b2 are connected in opposition and are connected to the input of an amplifier 6a which is also in the form of a phase comparator and which is connected to the HF-oscillator by way of a reference input. The two amplifiers 6 and 6a are connected on their output sides to change-over switching means 8. As long as the change-over switching means 8 is open, that is to say, as long as only the output of the amplifier 6 is connected by the change-over switching means 8 to a summing amplifier 6b, the signal at the output 9 of the measuring arrangement results only from the measuring signal of the inward component coils 4a1 and 4b1. That provides that just the slightest deviation results in an evaluatable change in the conditions of symmetry, by virtue of the small coil area which is effective in relation to the article. If in contrast the switching means 8 is closed, the output of the amplifier 6a is also connected to the input of the amplifier 6b, whereby the signal resulting from the outward component coils 4a2 and 4b2 also contributes to the sum signal at the output 9. By virtue of the larger effective coil area of the overall assembly of all component coils 4a1 to 4b2, in the above-indicated position of the switching means 8, the measuring arrangement provides a wide catch range which, even at large spacing from the article 7, is still capable of 'recognising' article irregularities in such a way that they can be evaluated. In that arrangement, a consideration of quite particular advantage is that it is possible to produce a kind of 'landscape image', that is to say, an image of the article under the sensing arrangement, if the assembly has a multiplicity of such component coils. In that arrangement, the coil area may be increased or reduced in size in steps. The change-over switching operation may advantageously be effected by a sequential switching arrangement (scanner), while the measurement values of the individual switching stages may be processed for example by microprocessors.

FIG. 3 shows an embodiment of a measuring arrangement which is of a similar design to the arrangement shown in FIG. 2c. Unlike the arrangement described with reference thereto, only the change-over switching means 8 is directly connected to the output of the component coils 4a1, 4a2, 4b1, 4b2 so that change-over switching into a position with a wide catch range and a second position with a high resolution capability occurs on the input side of the amplifier 6. It will be seen that the signals derived from the component coils 4a1 to 4b2 are connected directly in opposition to each other, which gives the same results as the circuit shown in FIG. 2c.

Figure 4A:
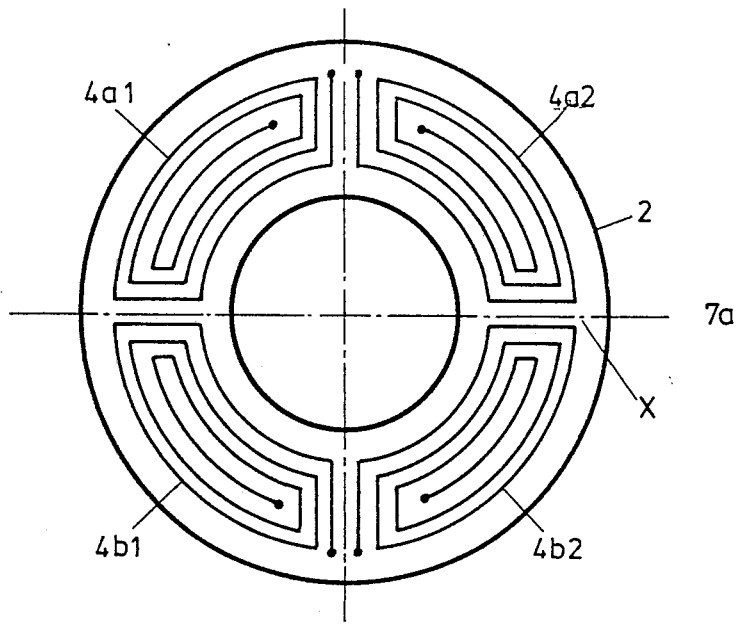
FIG. 4a shows an annular sensor arrangement with four component coils arranged in point symmetrical manner.
Figure 4B:

FIG. 4a shows an inductor sensor arrangement with annular component coils 4a1, 4a2, 4b1 and 4b2. The transmitting coil 1 is arranged on the top of the coil carrier 2 (see FIG. 4b). It will be seen that the sensor arrangement illustrated, after evaluation of the signals produced by the component coils 4a1, 4a2, 4b1, 4b2, provides information about the relative position of the axis of symmetry X of the coil carrier 2 with respect to the gap 7a, while also permitting the relative position with respect to a punctiform irregularity on the article to be determined. That is made possible by comparison of the output signals of the respectively diagonally oppositely disposed pairs of component coils 4a1,4b2 and 4a2 4b1.

Figure 5:
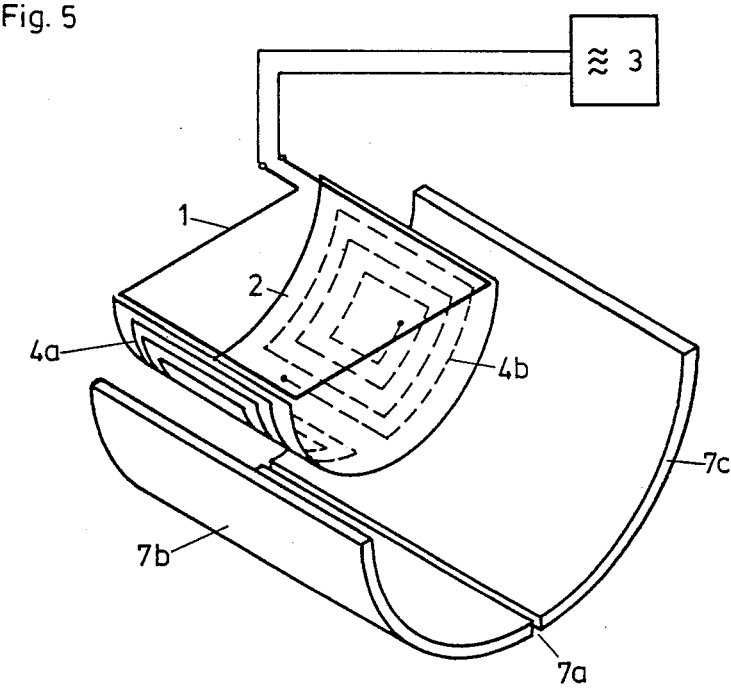
FIG. 5 shows a diagrammatic view of a sensor arrangement with a curve coil carrier.

FIG. 5 shows an embodiment wherein the coil carrier 2 is made from a flexible material and thus can be adapted to the curved surface of two metal strips 7b and 7c.

Figure 6:
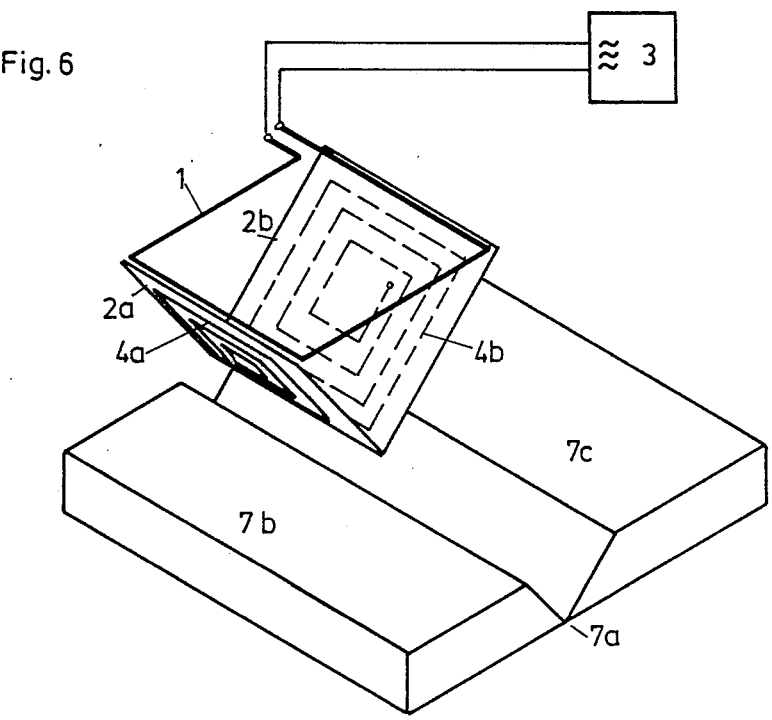
FIG. 6 shows a diagrammatic view of a sensor arrangement with two coil carriers which are disposed at an angle to each other.

FIG. 6 shows an embodiment wherein two coil carriers 2a and 2b are arranged at an angle to each other in order to be adapted to the surface configuration of two metal members 7b and 7c. The embodiments show the universal utility of the sensor arrangement according to the invention, with the alternative embodiments illustrated, it is possible to use a coil carrier comprising flexible insulating material, ceramic, glass, etc. depending on the conditions of use, operating conditions etc. The man skilled in the art is familiar with suitable materials.

FIGS. 7a and 7b impressively show the way in which a sensor arrangement may be further improved by 'packing', that is to say, connecting different coil carriers together in a stack-like form. In order to provide a clear view, two coil carriers 2a and 2b are shown at a spacing from each other in FIG. 7a. In the definitive installation position however, the two coil carriers 2a and 2b are joined together by adhesive and fixedly connected, as can be seen from FIG. 7b. Both coil carriers 2a and 2b have receiving component coils 4a1, 4b1 and 4a2, 4b2 respectively, which are each of substantially D-shape and which are applied in axial symmetry to the coil carriers 2 by a thin film process. The axes of symmetry X1 and X2 extend normal to each other and bisect each other. By virtue of that arrangement, the receiving component coils are affected by the transmitting coil 1 or asymmetries in respect of the article (not shown), as in the case of the embodiment shown in FIG. 7b. In this arrangement, however, by virtue of the coil shape (D-shape), the arrangement gives better signal resolution than in the case of the arrangement using individual coils wherein the winding portions extending parallel to the axis of symmetry are relatively short.

FIGS. 8a and 8b show a modified embodiment of a sensor arrangement with four coil carriers 2a, 2b, 2c and 2d. Similarly to the embodiment shown in FIG. 7, the transmitting coil 1 and receiving component coils 4a1, 4b1, 4a2 and 4b2 are arranged in D-form on the coil carriers 2a and 2b. An annular third receiving component coil 4c is additionally provided on the third coil carrier 2c, and can be used for measuring the spacing between the sensing arrangement and an article. Additionally mounted on a fourth coil carrier 2d are two circular conductors 11 and 12 which serve as capacitor surfaces and which can be connected in known manner to a means for capacitive measurement of the distance between the sensor arrangement and the article. The capacitive electrodes 11 and 12 may be used for individually measuring the spacing of the sensor arrangement from parts 7b, 7c of the article, with displacement in respect of height. As can be seen from FIG. 8b, the capacitor electrodes 11 and 12 are disposed on the back of the lowermost coil carrier 2d and are thus protected. The overall arrangement comprising the above-described plurality of component coils and the capacitor electrodes which are integrated in a fashion which is of optimum simplicity is extremely compact and reliable in operation and permits universally usable sensor arrangements with a very high degree of resolution to be produced.

Figure 9:
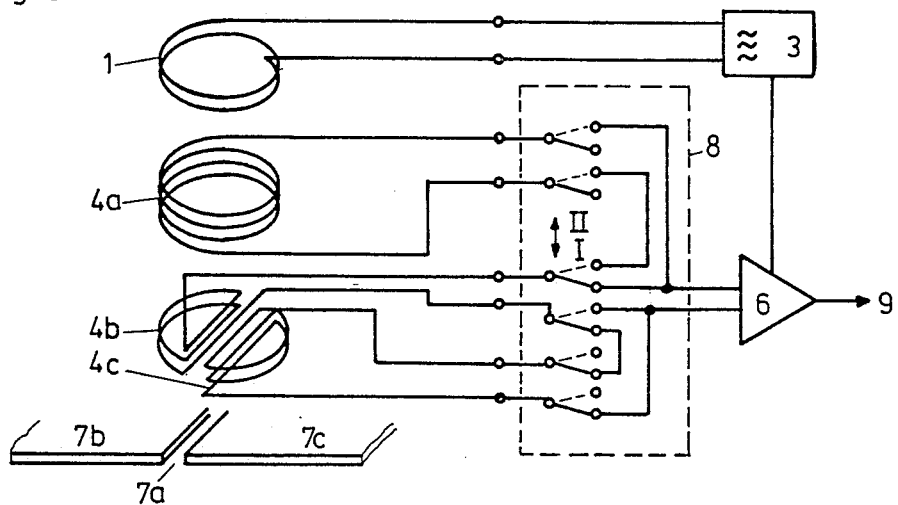
FIG. 9 shows a measuring arrangement with change-over switching means and component coils which can be switched over.

FIG. 9 shows an embodiment of a measuring arrangement according to the invention. The transmitting coil 1 and the receiving component coils 4a, 4b and 4c are not shown in this view as a layer which is disposed in a laminar condition on a coil carrier, as the measuring arrangement according to the invention, as shown in FIG. 9, can also be used in regard to coils which are wound in three dimensions. However, the measuring arrangement can be quite particularly advantageously formed with a sensor arrangement in accordance with one of the preceding examples.

Figure 10:
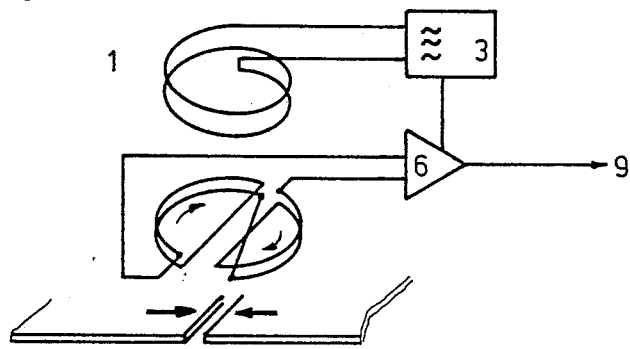
FIGS. 10I and 10II show views of the respective operatively interconnected component coils in positions I and II as shown in FIG. 9.
Figure 10:
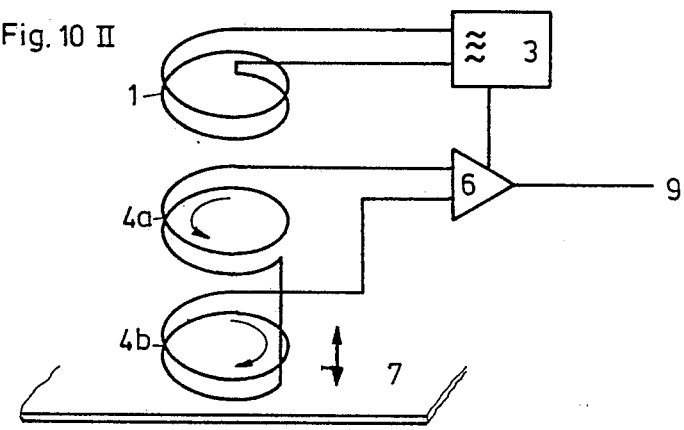

Referring to FIG. 9, the component coils 4a, 4b and 4c are connected at their output sides to a changeover switching means 8. The change-over switching means 8 provides that, in position I as shown in solid lines, the two component coils 4b and 4c are affected by the alternating field of the transmitting coil 1 in the manner described hereinbefore. In that way, by means of the sensor arrangement, the cut 7a between the two metal components 7b and 7c may be detected in regard to its relative position with respect to the component coils 4b and 4c. Accordingly, in position I of the change-over switching means 8, a signal occurs at the output 9 of the amplifier 6, indicating the lateral displacement of the sensor arrangement with respect to the cut 7a. That is diagrammatically shown in view I in FIG. 10. If on the other hand the change-over switching means 8 is moved into position II, the first component coil 4a and the second component coil 4b are then connected in opposition to each other. However, the resulting signal of those two component coils depends on the vertical spacing of the two component coils 4a and 4b from the metal component 7 so that, in position II, a signal occurs at the output 9 of the amplifier 6, that is proportional to the height or the vertical spacing of the sensor arrangement from the metal component 7. It will be seen that, by virtue of incorporating the change-over switching means 8, it is possible, using a single evaluation arrangement (amplifier 6), to produce at the output 9 both an output signal that is proportional to spacing and an output signal that is proportional to the lateral displacement with respect to irregularities on the article. That extremely economical and simple function is in particular also promoted by virtue of the fact that the receiving component coils 4a, 4b and 4c and the transmitting coil 1 can be produced and 'packed' in the above-described manner, in a very small space and in any desired alternative forms.

I claim:

1. An inductive sensor arrangement comprising a laminar coil carrier, transmitting coil means consisting of at least one transmitting coil, HF-oscillator means connected to supply said transmitting coil means with an a.c. voltage, receiving coil means consisting of at least one receiving coil, at least one of said coils of said transmitting coil means and said receiving coil means being applied as a metal layer to a surface of said laminar coil carrier, and said transmitting coil means and said receiving coil means being mounted in relation to said coil carrier for alternating current, when induced in said receiving coil means by said transmitting coil means, to be dependent in respect of at least one of the current values of phase relationship and amplitude, on the relative position of a metal article to be sensed with respect to the sensor arrangement, the winding axes of said coil means in use being oriented toward the article, at least one of said transmitting coil means and said receiving coil means comprising at least two coils, said at least two coils of the one said coil means and the other of said coil means being arranged with symmetry with respect to a feature of said laminar coil carrier, said symmetry being selected from axial symmetry with respect to at least one axis of symmetry on said laminar coil carrier and point symmetry with respect to at least one point of symmetry on said laminar coil carrier, whereby the distance or relative position of a surface irregularity or an edge of the metal article can be determined, and means for transmitting a signal according to such determination.

2. An inductive sensor arrangement according to claim 1, in which the coils of said transmitting coil means and said receiving coil means are applied as metal layers on both surfaces of said laminar coil carrier.

3. An inductive sensor arrangement according to claim 1, comprising two laminar coil carries stacked one above the other, coils of said transmitting coil means and said receiving coil means being applied as metal layers to the outer surfaces of said two laminar coil carriers and to one of the two facing surfaces of said laminar coil carriers.

4. An inductive sensor arrangement according to claim 1, in which said coils of said receiver coil means are arranged with axial symmetry with respect to at least one axis of symmetry on said laminar coil carrier.

5. An inductive sensor arrangement according to claim 1, in which said coils of said receiver coil means are arranged with point symmetry with respect to at least one point of symmetry on said laminar coil carrier.

6. An inductive sensor arrangement according to claim 1, in which said laminar coil carrier comprises a deformable material.

7. An inductive sensor arrangement according to claim 1, in which said laminar coil carrier is formed so as to present its coil carrying surfaces juxtaposed to and parallel to a surface of the article that deviates from a flat plane.

8. An inductive sensor according to claim 7, in which said laminar coil carrier is formed so as to present its coil carrying surfaces juxtaposed to and parallel to a surface of the article comprising two flat planes at an angle to each other.

9. An inductive sensor arrangement according to claim 1, in which said laminar coil carrier is a plate comprising electrically non-conductive material.

10. An inductive sensor arrangement according to claim 1, in which said coils of said transmitting coil means are formed on said laminar coil carrier by a thick film process.

11. An inductive sensor arrangement according to claim 1, in which all said coils are formed on said laminar coil carrier by a thin film process.

12. An inductive sensor arrangement according to claim 3, in which said receiving coil means are applied to each of said outer surfaces of said laminar coil carriers and each comprises at least two component coils located on opposite sides of an axis of symmetry on the respective surface, said laminar coil carriers being so relatively located that the axis of symmetry on one of said outer surfaces intersects the axis of symmetry on the other of said outer surfaces as said laminar coil carriers are viewed in plan.

13. An inductive sensor arrangement according to claim 3, in which said receiving coil means are applied to each of said outer surfaces of said laminar coil carriers and each comprises at least two component coils located at opposite sides of and substantially parallel to an axis of symmetry on the respective surface, said laminar coil carriers being so relatively located that the axis of symmetry on one of said outer surfaces intersects at a right angle the axis of symmetry on the other of said outer surfaces as said laminar coil carriers are viewed in plan, and said receiving coil means on each said laminar coil carrier present coils of substantially the same plan form as said laminar coil carriers.

14. An inductive sensor arrangement according to claim 1, including a metal conductor of laminar configuration additonally mounted on said laminar coil carrier to form an electrode for capacitatively measuring the distance between the inductive sensor arrangement and the article.

15. A measuring arrangement for determining the relative position of a sensor arrangement with respect to a metal article, comprising a sensor arrangement including transmitting coil means and receiving coil means, at least one of said transmitting coil means and said receiving coil means being divided into at least two component coils, an HF-oscillator, means connecting said HF-oscillator to said transmitting coil, an evaluation circuit for determining at least one of the values of phase relationship and voltage of an alternating current induced in said receiving coil means by said transmitting coil means while dependent on changes in the relative position of the article and said sensor arrangement, and change-over switching means interposed between on the one hand one of said transmitting coil means and said receiving coil means and on the other hand said evaluation circuit for selectively connecting at least one of said component coils to said evaluation circuit.

16. A measuring arrangement according to claim 15, in which said component coils respectively cover different areas relatively to the position to be determined of the article.

17. A measuring arrangement according to claim 15, for measuring in addition to the spacing of the sensor arrangement with respect to the surface of the article, the lateral relative position of the sensor arrangement and an irregularity of the article, in which measuring arrangement said receiving coil means comprise at least one pair of component coils spaced relatively to each other on opposite sides of an axis of symmetry in the plane of each coil, said receiving coil means comprising also at least one auxiliary coil arranged to be disposed at a different spacing from the article than said component coils, and said change-over switching means being connected between said receiving component coils and said evaluation circuit and operative, on the one hand, to connect said receiving component coils in opposition for signals to be applied to said evaluation circuit for measurement in respect of lateral relative position of said article and, on the other hand, to connect at least one of said component coils in opposition to said auxiliary coil for signals to be applied to said evaluation circuit for measurement of the distance of the article.

18. A measuring arrangement according to claim 15, provided with a plurality of said pairs of component coils and in which said change-over switching means are arranged for scanning said pairs of coils in sequence.

* * * * *